(12) United States Patent
Doi

(10) Patent No.: US 6,650,471 B2
(45) Date of Patent: Nov. 18, 2003

(54) RESIN COMPOSITION FOR PRODUCTION OF OPTICAL ELEMENT, THE OPTICAL ELEMENT, AND PROJECTION SCREEN

(75) Inventor: Yasuhiro Doi, Tokyo (JP)

(73) Assignee: Dai Nippon Printing Co., Ltd., Tokyo-To (JP)

(*) Notice: Subject to any disclaimer, the term of this patent is extended or adjusted under 35 U.S.C. 154(b) by 0 days.

(21) Appl. No.: 10/244,233

(22) Filed: Sep. 16, 2002

(65) Prior Publication Data

US 2003/0081311 A1 May 1, 2003

(51) Int. Cl.[7] .................. G03B 21/56; G03B 21/60; G02B 3/08; B29D 11/00
(52) U.S. Cl. .................. 359/443; 457/742; 264/1.32
(58) Field of Search .................. 359/443, 457, 359/742; 264/1.1, 1.32; 522/100, 102, 106

(56) References Cited

U.S. PATENT DOCUMENTS

| | | | | |
|---|---|---|---|---|
| 4,668,558 A | * | 5/1987 | Barber | 264/1.1 |
| 5,384,659 A | * | 1/1995 | Shikama et al. | 359/719 |
| 5,903,399 A | * | 5/1999 | Yamashita et al. | 359/742 |
| 6,271,965 B1 | * | 8/2001 | Miyata | 359/457 |
| 6,478,990 B1 | * | 11/2002 | Powers et al. | 264/1.1 |

* cited by examiner

Primary Examiner—Christopher E Mahoney
(74) Attorney, Agent, or Firm—Timothy J. Keefer; Wildman, Harrold, Allen & Dixon LLP

(57) ABSTRACT

A resin composition for production of an optical element being adapted to form the optical element has a characteristics of which, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; $W_{0.1}$ (° C.) represents, regarding the crest portion, the width of the crest portion at the position of 0.1 of the maximum value of the loss factor; and $\Delta W$ (° C.), the difference between the widths of the two crest portions, is set to be $\Delta W = W_{0.1} - W_{1/2}$, the $\Delta W$ is in the range of from 16° C. to 31° C.

24 Claims, 8 Drawing Sheets

RESIN COMPOSITION FOR PRODUCTION OF OPTICAL ELEMENT, THE OPTICAL ELEMENT, AND PROJECTION SCREEN

BACKGROUND OF THE INVENTION

1. Field of the Invention

The present invention relates to a resin composition for production of an optical element and, more particularly, to a resin composition for production of an optical element which, by defining the resin composition with the parameters associated with the viscoelasticity, when an optical element formed with this resin composition is used, prevents the surface thereof from being scraped away, being worn, or being crushed by application thereto of a pressure, as much as possible.

Also, the present invention relates to an optical element which, in a case where using the optical element in combination with other optical members such as a lenticular lens sheet, can prevent the surface of such other optical member from being scraped off or worn as much as possible and to a projection screen which comprising a combination of the optical element and the lenticular lens sheet.

2. Description of the Related Art

An optical element has an optical element surface produced by a layer of resin composition having imparted there to an optical configuration being laminated on a transparent base member, or by an optical configuration being imparted directly onto such layer, only, of resin composition. While as the optical configuration of the optical element surface there are a wide variety of optical configurations, in the optical element formed using resin composition, in many cases, it has a surface configuration wherein fine lens configurations are arrayed and which, therefore, when viewed as a whole, comprising a large number of concavities and convexities.

Incidentally, when using the optical element, it is sometimes used by combining a plurality of optical elements. When using the optical element by combining two or more optical elements, in order to exhibit their effects to the maximum extent and also concurrently protect the optical element surfaces, locating the optical elements closely to each other with their surfaces opposing each other is often performed.

The most typical example is the case of a Fresnel lens sheet and lenticular lens sheet in a projection screen, in which, ordinarily, the both sheets are used with the Fresnel lens (circular Fresnel convex lens) surface and the lenticular lens surface being located closely to each other.

When locating the optical elements with their respective opposing surfaces being disposed closely to each other in the above-described way, since the both surfaces are a concavo-convex surface, they affect their opponent's surfaces.

For example, in the above-described typical example, the cross-sectional configuration of the Fresnel lens surface is in the form of a saw-tooth like configuration and sharpens at its forward ends. On the other hand, the lenticular lens has its cross section rounded into a circular or elliptical, i.e. embossed, configuration. When such Fresnel lens sheet and lenticular lens sheet have been located closely to each other, the embossed apex of the lenticular lens and the sharpened forward end of the Fresnel lens are point-contacted with each other. Therefore, it can happen that, due to the contact pressure, the deformation of the lenticular lens and/or Fresnel lens, i.e. the crushing of the configuration thereof, will occur.

The above-described crushing of the lens configuration can indeed be prevented by increasing the hardness of the resin forming the lens. However, simply increasing that hardness results in that, when handling, or sheet-cutting, the lens becomes likely to chip off, and thus conversely causes a problem. Therefore, it is preferred to leave the viscosity not fully removed while the hardness is increased.

In addition, although the hardness of resin in general is closely related to the glass transition temperature (Tg), excessively decreasing the glass transition temperature (Tg) of resin becomes unable to obtain the rubber elasticity, with the result that applying a pressure causes the resin to get plastically deformed. Ordinarily, if the resin has some extent of crosslink density, even when the glass transition temperature is low, the rubber elasticity takes effect and, therefore, even when a pressure is applied, the resin does not get plastically deformed. In the case of the resin composition for production of an optical element, attempting to decrease the glass transition temperature and simultaneously to increase the crosslink density results in that introducing a high integrity of chains, which comprising a benzene ring or the like, is needed for the purpose of enhancing the refractive index which is requisite as the resin composition for production of an optical element. This becomes a cause of elevating the glass transition temperature. Conversely, regarding the method of increasing the glass transition temperature, although it is advantageous in terms of the enhancement of the refractive index, excessively increasing the glass transition temperature makes the rigidity excessively high, which may also cause a curving of the lens sheet.

Also, the optical element is not always used at normal temperature. When used in optical appliances or display devices, the production of heat from within the appliance or device can leave the optical element exposed to a high temperature. Also, when the product is shipped from the production factory and is in transit, it is possible that the temperature within the container or the hold will become 60° C. or so. At these high temperatures, the above-described drawbacks will become more serious.

SUMMARY OF THE INVENTION

It is therefore an object of the present invention to provide a resin composition for production of an optical element which can solve over the above-described wide temperature range the drawbacks that include the respect that, conventionally, when the fellow optical element surfaces of the optical elements are located closely to each other, there is the possibility that the configuration of the optical element would be crushed and deformed due to the contact pressure; the respect that even if simply increasing the hardness, the optical element surface becomes likely to chip off and there is therefore the possibility that when handling or sheet-cutting a problem would be caused; the respect that when excessively decreasing the glass transition temperature of the resin, it becomes impossible to obtain the rubber elasticity and resultantly when a pressure is applied the resin gets plastically deformed; the respect that even when attempting to solve this drawback by increasing the crosslink density, because it is needed to enhance the refractive index, decreasing the glass transition temperature is hindered; and the respect that when conversely making it excessively high, because the rigidity becomes excessively increased, it results that a curving of the lens sheet occurs.

It is another object of the present invention to provide an optical element which has been formed with the thus-improved resin composition for production of an optical element.

The above-described objects have been attained by determining the relationship between the loss factor (tan δ; loss tangent) of the resin composition and the temperature and defining the range of the peak width, or, further, defining the range of the temperature (the temperature capable of reflecting the glass transition temperature) corresponding to the peak of the loss factor.

According to a first aspect of the present invention, there is provided a resin composition for production of an optical element being adapted to form the optical element, wherein, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; $W_{0.1}$ (° C.) represents, regarding the crest portion, the width of the crest portion at the position of 0.1 of the maximum value of the loss factor; and $\Delta W$ (° C.), the difference between the widths of the two crest portions, is set to be $\Delta W = W_{0.1} - W_{1/2}$, the $\Delta W$ is in the range of from 16° C. to 31° C.

According to a second aspect of the present invention, there is provided a resin composition for production of an optical element being adapted to form the optical element, wherein, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; and $W_{0.1}$ (° C.) represents, regarding the crest portion, the width of the crest portion at the position of 0.1 of the maximum value of the loss factor, $W_{0.1}/W_{1/2}$ representing the ratio between the widths of the two crest portions is in the range of from 1.4 to 2.7.

According to a third aspect of the present invention, there is provided a resin composition for production of an optical element being adapted to form the optical element, wherein $W_{1/2}$ (° C.) representing, regarding a crest portion in a loss factor/temperature curve obtained by measuring the loss factor of the resin composition relative to a change in the temperature, the width of the crest portion at the position of ½ of the maximum value of the loss factor in the crest portion temperature range is in the range of from 13° C. to 50° C. and the value $T_P$(° C.) of the temperature at the maximum value of the loss factor is in the range of from 18° C. to 47° C. or from 52° C. to 80° C.

A fourth aspect of the present invention provides a resin composition for production of an optical element according to anyone of the first to third aspects, wherein the maximum value of the loss factor is in the range of from 0.4 to 1.2.

According to a fifth aspect of the present invention, there is provided an optical element the whole or a part of which is formed with the resin composition for production of an optical element as described in any one of the first to fourth aspects.

A sixth aspect of the present invention provides an optical element according to the fifth aspect, wherein the optical element is a Fresnel lens sheet.

According to a seventh aspect of the present invention, there is provided a projection screen which comprising the optical element as described in the fifth or sixth aspect and a lenticular lens sheet.

DETAILED DESCRIPTION OF THE PREFERRED EMBODIMENTS

Figure 1:
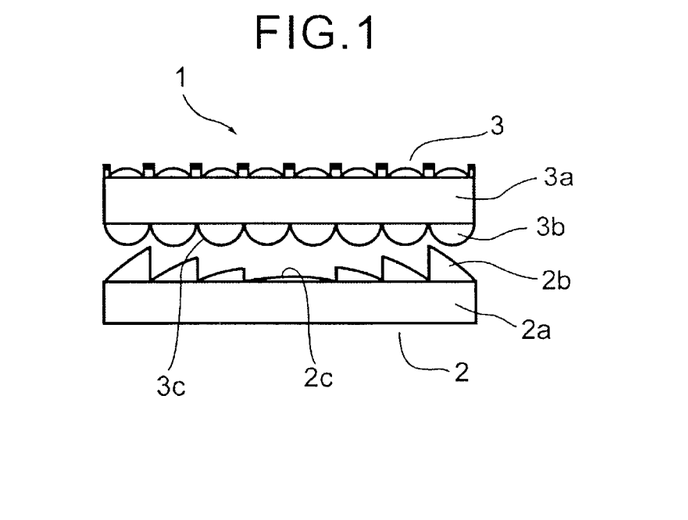
FIG. 1 is a view showing an optical element according to according to an embodiment of the present invention.

FIG. 1 is a schematic view showing an optical element according to an embodiment of the present invention. In this figure, a Fresnel lens sheet 2 and a lenticular lens sheet 3 are disposed in the way in which their respective lens surfaces 2c and 3c oppose each other. They are located closely to each other to construct a projection screen 1.

Also, in FIG. 1, in any one of the lens sheets 2 and 3, illustration is made in the way in which lens layers 2b and 3b are laminated respectively on base members 2a and 3a. However, the base member and the lens layer may be not separate from each other but integral with each other.

Further, as shown in FIG. 1, the lenticular lens sheet 3 may have a small lenticular lens, protruding portions, and black stripe on the surface on a side thereof opposite to the side thereof having the location of the Fresnel lens sheet 2.

Other than the configuration of the lenticular lens or Fresnel (convex) lens explained in conjunction with FIG. 1, the optical element may have a given optical configuration such as a Fresnel concave lens, prism, or fly-eye lens. Further, one elemental optical device may have on its both surfaces the same kind, or different kinds, of optical configurations.

In the present invention, in order to form the optical element as a whole, or, in a case where this optical element has a lens layer on its base member, to form this lens layer, there is used a resin composition which has been defined with various indexes or characters, such as those explained later, which have been determined from the loss factor/temperature curve.

Incidentally, here, the word "resin composition", when expressed directly, indicates the state of a product, or, if so referred to for the purpose of measurement, indicates the state of a thin-plate-like resin sheet or lens layer. However, it includes a not already cured composition which is in the state of a material before it is manufactured into a product and which, if it has been made into the state of a product, or if it has been made into a thin plate like configuration for purpose of measurement, can satisfy various indexes (or characters) which will be explained later.

The resin composition maybe an ionizing radiation curable material consisting mainly of an oligomer and/or monomer of an acrylate-based compound which is an ionizing radiation curable, radical-polymerizable type of compound, or may be a material having as a base material an oligomer and/or monomer of a cation-polymerizable type of epoxy based compound or oxetane based compound and having blended therewith according to the necessity an additive for purpose of curing such as ultraviolet ray polymerization initiator, sensitizer, etc. These additives for curing purpose are decomposed when the resin composition gets polymerized and, therefore, in the state of a product, those decomposed materials remain to exist. Also, the resin composition may be a material having blended therewith thermoplastic resin for the purpose of improving the properties of the product which will be obtained.

Also, the resin composition may a material having blended therewith various additives that can be added when manufacturing an ordinary sheet-like or plate-like resin product and further may be a material having blended therewith a light diffusion agent, a colorant, etc. for the purpose of improving the optical performance of the optical element.

To determine the loss factor/temperature curves of the respective resin compositions, there is determined the change of the loss factor (tan δ; loss tangent) relative to the temperature by using a dynamic viscoelasticity measuring device, measuring the loss factor while periodically applying vibrations to the sample in the direction of the long axis thereof, and measuring it by changing the temperature of the sample when performing the measurement. Incidentally, the details of the measurements for determining various indexes are the same as those which are obtained when explaining in the later-exemplified instances.

Figure 2:
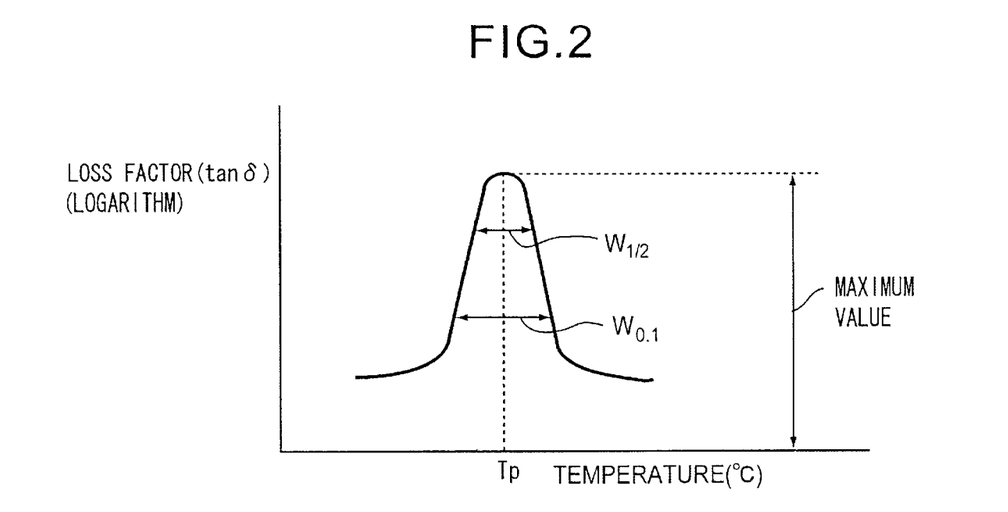
FIG. 2 is a graph showing a loss factor/temperature curve.

Typically, as shown in FIG. 2, the loss factor/temperature curve is shaped, in the vicinity of the temperatures specific for the respective resin composition, like a crest with an upwardly convex configuration, and, according to the respective resin compositions differing in nature from one another, exhibits a different shape of crest. From this, the peak value, i.e. the maximum value of the loss factor can be determined on the apex of the crest configuration. However, the value TP of the temperature corresponding to the maximum value of the loss factor indicates a critical temperature at which the behavior of the resin composition is the most sensitive to the change in the temperature. It is similar to the so-called glass transition temperature. However, that temperature is the one which had better be avoided from the viewpoint of manufacture or from the viewpoint of keeping the product stored. Therefore, that temperature is used as the index for defining each of the resin compositions.

Whether the configuration of the crest such as that in the loss factor/temperature curve of the respective resin composition is steep or gentle can be determined by causing a straight line parallel to the abscissa axis to intersect the configuration of the crest and from the thus-obtained relationship of the distance (i.e. the width) between these intersections with respect to the height. When discussing the curve of such crest configuration, using as the representative value the width at a height corresponding to the half of the height corresponding to the highest portion of the crest sometimes occurs. Usually, this width is called "the half value width" and, here, also, this half value width $W_{1/2}$ is used as the representative value.

However, although the half value width is indeed effective when the configurations of the crests have a resemblance in shape, in a case where the configuration of the crest does not have a resemblance, the difference between each two of the configurations of the crests cannot be sufficiently expressed. Therefore, here, there is used as another representative value the width$_{0.1}$ (this is temporarily referred to, here, as "0.1 width") at a height of $1/10$ of the highest portion of the crest configuration, i.e. 0.1.

Here, since two values are produced in terms of the width of the crest, in order to express the width of the crest configuration in the way in which the both widths are connected with each other, the difference and ratio between these two values are used. Namely, the $W_{0.1}-W_{1/2}$ is used as the difference $\Delta W$ between the two widths of the crest while the $W_{0.1}/W_{1/2}$ is used as the ratio between the two widths of the crest. The configuration of the crest can be more precisely shown by using these combinations of $W_{0.1}$ and $W_{1/2}$.

Further, regarding the storage elastic modulus which is determined when measuring the dynamic viscoelasticity, the value at the portion where, when measured while the temperature is being changed, this storage elastic modulus comes into a state of equilibrium on the high-temperature side is used as one index. Specifically, the storage elastic modulus when the temperature is 80° C. is referred to as the equilibrium elastic modulus.

Regarding the resin composition according to the present invention, it is preferable that the value of the previously determined $\Delta W$ be in the range of from 16° C. to 31° C. In a case where less than 16° C., since in the vicinity of the maximum value of the loss factor the behavior of the resin composition is excessively sensitive to the change in temperature, this case is unpreferable from the standpoint of manufacture or from the standpoint of keeping the product in custody. Also, when exceeding 31° C., although in the vicinity of the maximum value of the loss factor the behavior of the resin composition ceases to become sensitive to the change in temperature even if the temperature changes, the configuration of the optical element surface of the optical element formed with this resin composition for production of an optical element becomes likely to be damaged by the pressure that, when the optical element is in use, is applied to it. In addition, also, when the optical element is piled up in the state of its being made horizontal, the configuration thereof becomes likely to be crushed and, therefore, this case is not preferable from the standpoint of handling such as the keeping in custody, transporting, etc. of the optical element.

Regarding the resin composition for production of an optical element according to the present invention, it is preferable that the previously determined ratio between the two width values of the crest be in the range of from 1.4 to 2.7. The points in problem which occur when less than 1.4 and when more than 2.7 are the same as those, respectively, in the immediately preceding paragraph, which occur when the $\Delta W$ has fallen under the preferred range and fallen over the same.

Also, regarding the resin composition for production of an optical element according to the present invention, it is preferable that the previously determined half value width ($W_{1/2}$) be in the range of from 13° C. to 50° C. and that width is further preferable when in the range of from 13° C. to 44° C. In a case where less than 13° C., regardless of the value of the previously determined 0.1 width, in the vicinity of the maximum value of the loss factor, the behavior of the resin composition is excessively sensitive to the change in temperature. Therefore, in this case, the range is not preferable from the standpoint of manufacture or from the standpoint of keeping the product in custody. Also, in a case where exceeding 50° C., it is also needed to take the temperature $T_P$ into consideration. Although in the vicinity of the maximum value of the loss factor the behavior of the resin composition ceases to become sensitive to the change in temperature even if the temperature changes, when the temperature $T_P$ is higher than normal temperature, the configuration of the optical element surface of the optical element formed with this resin composition for production of an optical element becomes likely to be damaged by the pressure that, when the optical element is in use, is applied to it. In addition, also, when the optical element is piled up in the state of its being made horizontal, the configuration thereof becomes likely to be crushed and, therefore, this case is not preferable from the standpoint of handling such as the keeping in custody, transporting, etc. of the optical element. However, when the $T_P$ is lower than normal temperature, the resin composition conversely tends to become unlikely to deform. Therefore, it is also necessary to consider the temperature $T_P$ in addition to the $W_{1/2}$.

Accordingly, in addition to the requirement that the above-described half value width be in the range of from 13° C. to 50° C., regarding the resin composition according to the present invention, it is necessary that the previously determined $T_P$ be in the range of from 18° C. to 47° C. or from 52° C. to 80° C. More preferably, the $T_P$ is in the range of from 18° C. to 47° C. or from 52° C. to 71° C. As stated previously, the $T_P$ is a critical temperature at which the behavior of the resin composition is the most sharply sensitive to the change in the relevant temperature and therefore the $T_P$ has a similarity to the so-called glass transition temperature. However, the $T_P$ is a temperature which had better be avoided the most from the standpoint of manufacture or from the standpoint of keeping the product in custody.

When less than 18° C., the difference of the glass transition temperature from normal temperature (25° C.) is small and therefore the resin composition becomes always unstable in terms of its behavior. Therefore, the range in this case is not preferable. When more than 80° C., if viewing from the thermal point of view, in a case where the resin composition is used in the way of being incorporated into an optical appliance or display device, it can resist the temperature to which it is exposed, the hardness of it becomes excessively high. As a result, when it is handled or machined, a chipping-off of it occurs, or, when the fellow optical elements are disposed closely to each other, that hardness in excess also becomes a cause of the combined structure getting curved. Therefore, this range is not preferable.

The reason why the temperature TP is defined, in the preceding description, to be in the range of from 18° C. to 47° C. or from 52° C. to 80° C. is as follows. Namely, because the optical element formed with the resin composition ranging from a temperature higher than 47° C. to a temperature lower than 52° C. has a temperature which almost coincides with the temperature in the temperature range within or over which the optical appliance or the display device is actually used, there is the practical demerit that the optical element is liable to be affected by the increase in the heat. Of course, if the optical element is isolated from the heat sources, or the temperature range within which the optical element is actually used can be decreased utilizing suitable cooling measure such as air circulation, the resin composition falling within the range of from 47° C. to 52° C. exclusive can also be used.

Regarding the resin composition for production of an optical element according to the present invention, it is more preferable to further define the range of maximum values of the loss factors in addition to the range definition wherein the range of $T_P$ is added to the above-described range definition for $\Delta W$, that for $W_{0.1}/W_{1/2}$, or that for $W_{1/2}$.

The maximum value of the loss factor, preferably, is in the range of from 0.4 to 1.2, or, more preferably, from 0.46 to 1.12. The reason for this is as follows. Regarding the resin composition for production of an optical element having a loss factor maximum value of less than 0.4, although it is preferable in the respect of its having high resistance to deformation when an external force has been applied to it, its strength for mitigating the persistent vibrations that rub it becomes weak. This results in the drawback that it becomes difficult to avoid being damaged due to the wear. On the other hand, when the maximum value of the loss factor exceeds 1.2, the mechanical strength at the time of a high temperature decreases with the result that the resin composition comes to have the drawback of its becoming likely to be deformed.

EXAMPLE

Using the resin composition, samples were produced, and, below, the measured results of the above-described various kinds of parameters and the evaluated results on the assumedly practical use of the Fresnel lens sheet produced using that resin composition are shown.

The parameters that were used were the compression modulus of elasticity, the maximum amount of deformation, the $T_P$, the maximum value of the loss factor, the average elastic modulus, and the $W_{1/2}$ and $W_{0.1}$ values in the loss factor/temperature curve. The items of the product that were evaluated from the assumedly practical point of view were the crushing of the screen at the time of the sample being actually mounted, the by loading of weight caused crush of the screen, and the by loading of weight caused crush of the Fresnel lens sheet.

The items regarding which no particular temperature range is defined were determined under the assumption that the temperature be 25° C.

(Production of the Samples Used for Measuring the Compression Modulus of Elasticity and the Maximum Amount of Deformation)

A Fresnel lens forming die having a die configuration inverse to the configuration of the Fresnel lens was heated and, on the surface of the die, ionizing radiation curable resin composition was coated so that the thickness thereof may become 200 μm. While maintaining the temperature of the coated resin composition at 42° C., using an ultraviolet ray lamp of metal halide type (manufactured by JAPAN STORAGE BATTERY CO., LTD.), light was radiated under the conditions that the totaled amount of light was 2000 mJ/cm$^2$ and the peak illuminance was 250 mW/cm$^2$, to cure the resin composition and this resin composition was removed from the die to obtain a Fresnel lens sheet for use as the sample.

(Measurement of the Compression Modulus of Elasticity and the Maximum Amount of Deformation)

For measuring the compression modulus of elasticity and the maximum amount of deformation, a universal hardness test which uses a very small hardness tester (manufactured by German Fisher Company, H-100V) was applied. Namely, the load applied by an indenting tool was gradually increased up to a prescribed value and, thereafter, was gradually decreased, to thereby determine a load/indentation curve. From this result, through the analyses of these curves, the compression modulus of elasticity and the maximum amount of deformation were determined. As the indenting tool, there was used a ball indenting tool that was made using tungsten carbide (WC) and the radius of that was 0.4 mm φ.

Figure 3:
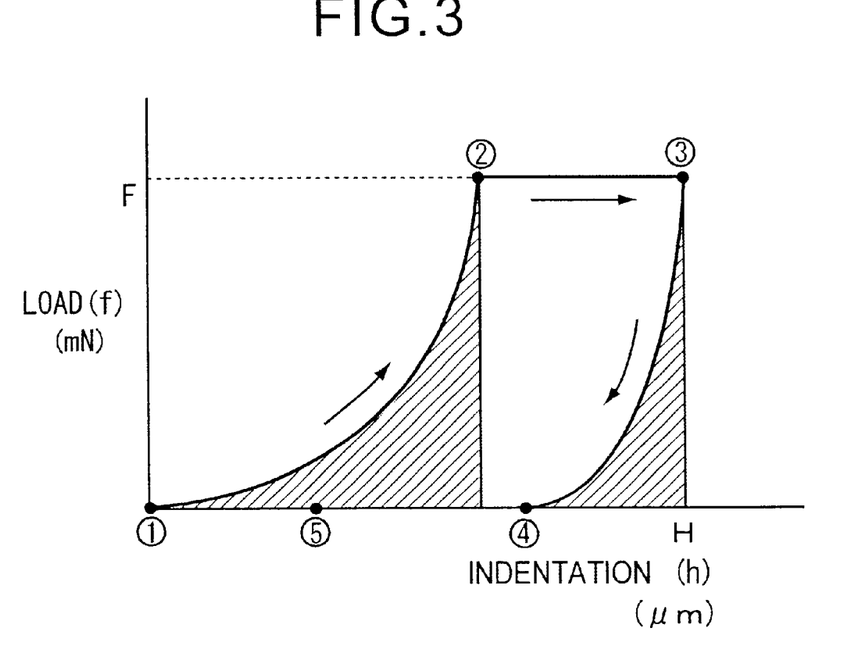
FIG. 3 is a graph showing a load/indentation curve.

The load/indentation curve, typically, exhibits a state such as that shown in FIG. 3. First, increasing by degrees the load f from the point (1) representing the zero load causes plastic deformation of the sample lens, with the result that the intrusion of the indenting tool is gradually increased. As indicated at a portion that coincides with the point (2), stopping the increase in the load at a certain value of load stops the intrusion of the indenting tool by plastic deformation. When, thereafter, the value of the load is maintained as is, during this time period the increase in the indentation by creep deformation continues until the point (3) at which there is stopped the maintenance of the value of the load is reached. Thereafter, gradually decreasing the load results in the decrease in the indentation toward the point (4).

In the above description, the maximum load value F which is the value of the load at the point (2) in FIG. 3 was set to be 20 mN. The contact pressure between the Fresnel lens sheet and lenticular lens sheet of an actual projection screen is small in value and therefore actually measuring it is virtually impossible. However, if the deformation of the lens sheet forming the screen is around 10 μm at the outer-peripheral portion of it needed to meet the severe relevant conditions, such deformation is permissible in terms of the lens performance. Therefore, in view of the fact that the load necessary for the conventionally used lens sheet to deform 10 μm is around 20 mN, here, also, the maximum load value was determined so.

Also, the time period during which to cause creep deformation, suitably, was 60 seconds.

After all, the procedure for determining the load/indentation curve is as follows.
(1) The load value for effecting compression is increased 100 steps in units of 0.1 second until it becomes 20 mN from 0 mN.
(2) The load value that has become 20 mN is maintained for 60 seconds to cause creep deformation.
(3) The load value is decreased 40 steps in units of 0.1 second until it becomes 0.4 mN (the smallest load of the tester).
(4) The load value is maintained for 60 seconds while it is kept at 0.4 mN to restore the indentation.
(5) The procedural steps (1) to (4) above are repeated two times.

Figure 4:
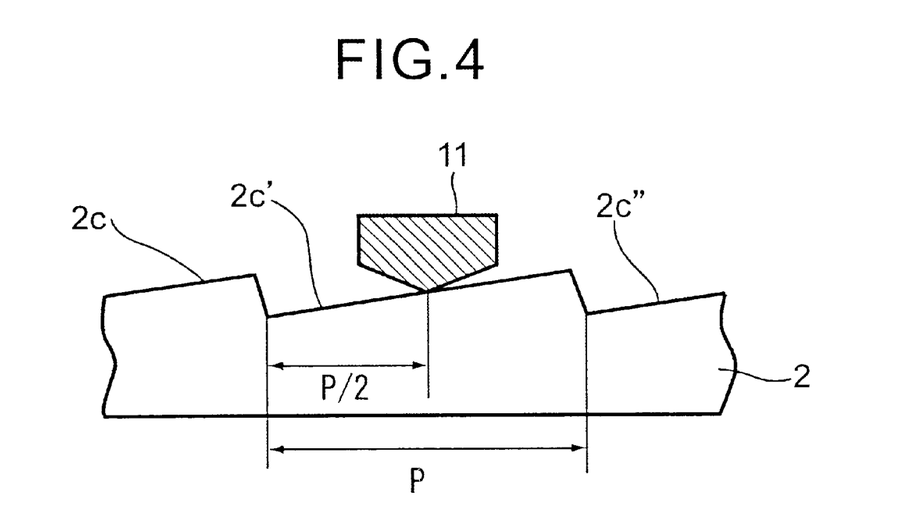
FIG. 4 is a view showing a position at which an indenting tool is acted upon.
Figure 5:
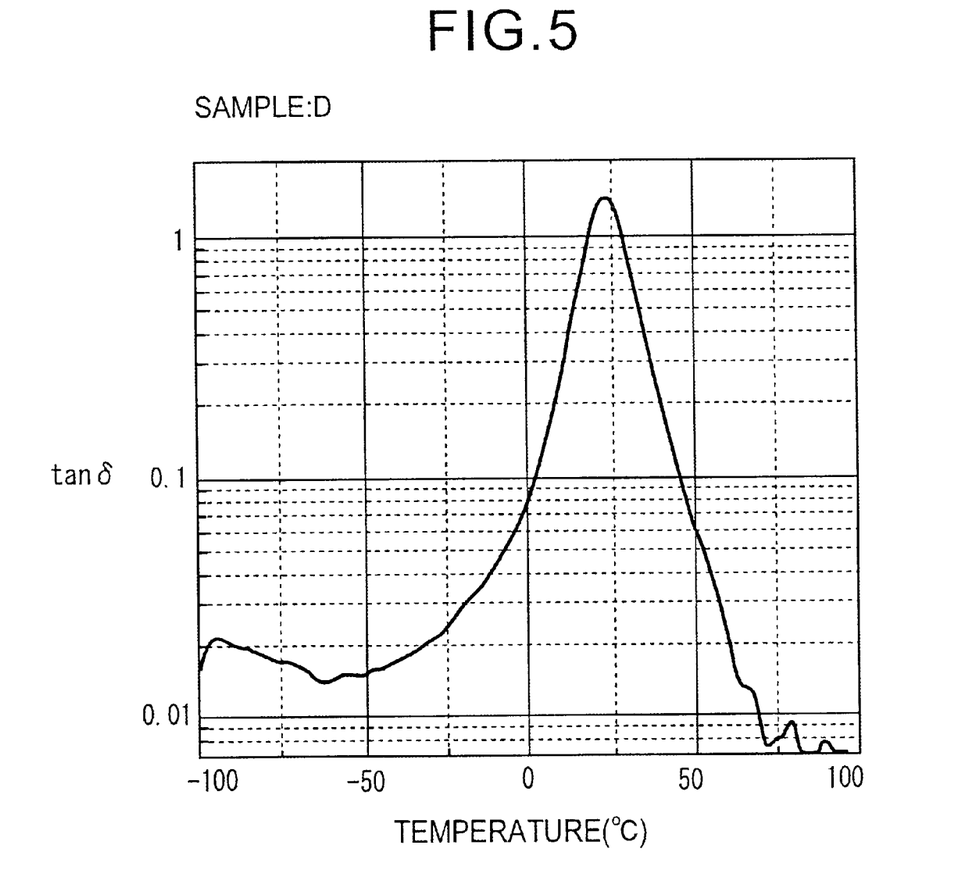
FIG. 5 is a graph showing the loss factor/temperature curve of a sample symbol D.
Figure 6:
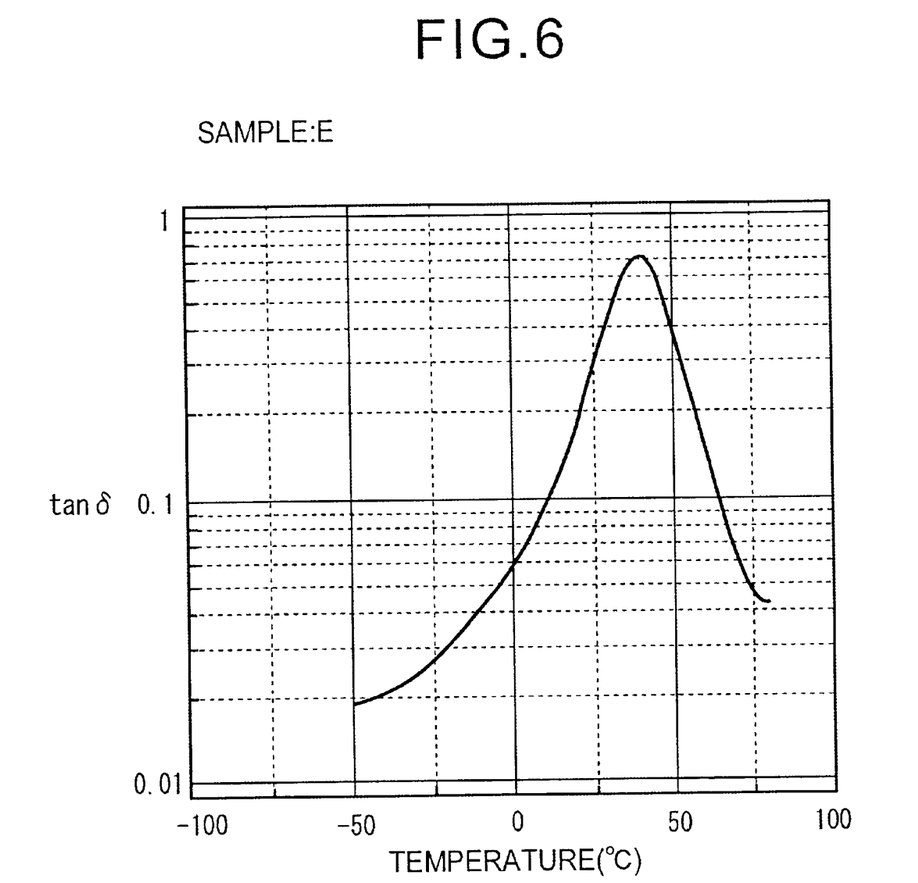
FIG. 6 is a graph showing the loss factor/temperature curve of a sample symbol E.
Figure 7:
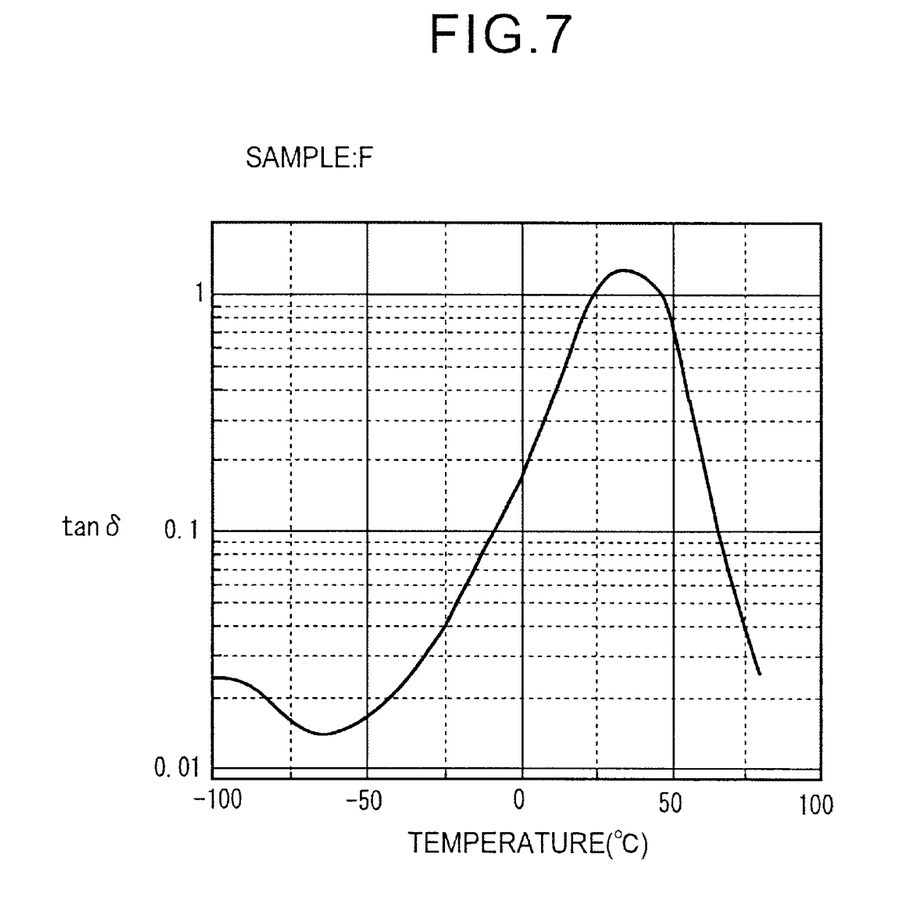
FIG. 7 is a graph showing the loss factor/temperature curve of a sample symbol F.
Figure 8:
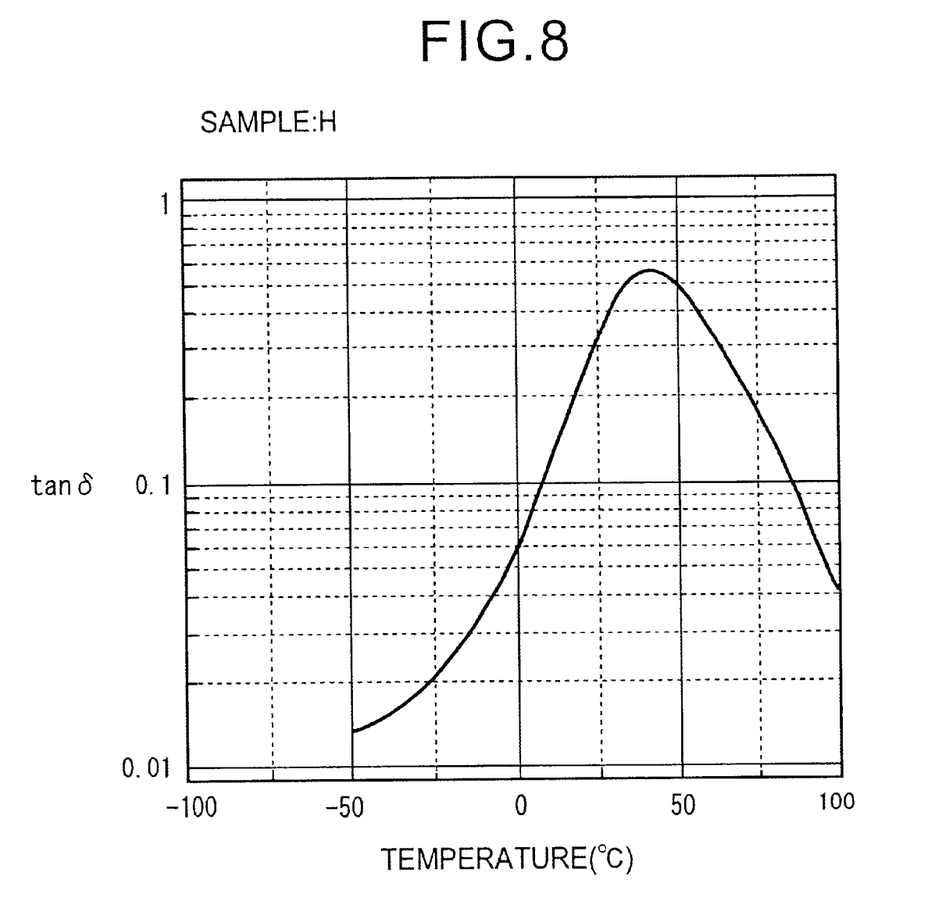
FIG. 8 is a graph showing the loss factor/temperature curve of a sample symbol H.
Figure 9:
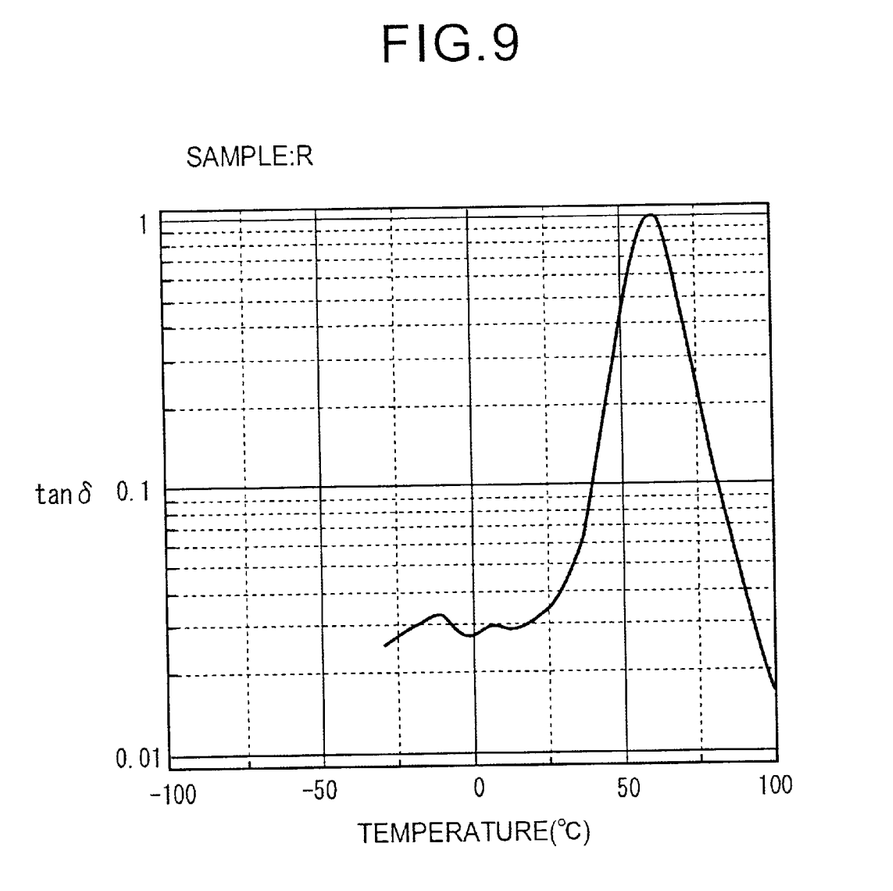
FIG. 9 is a graph showing the loss factor/temperature curve of a sample symbol R.
Figure 10:
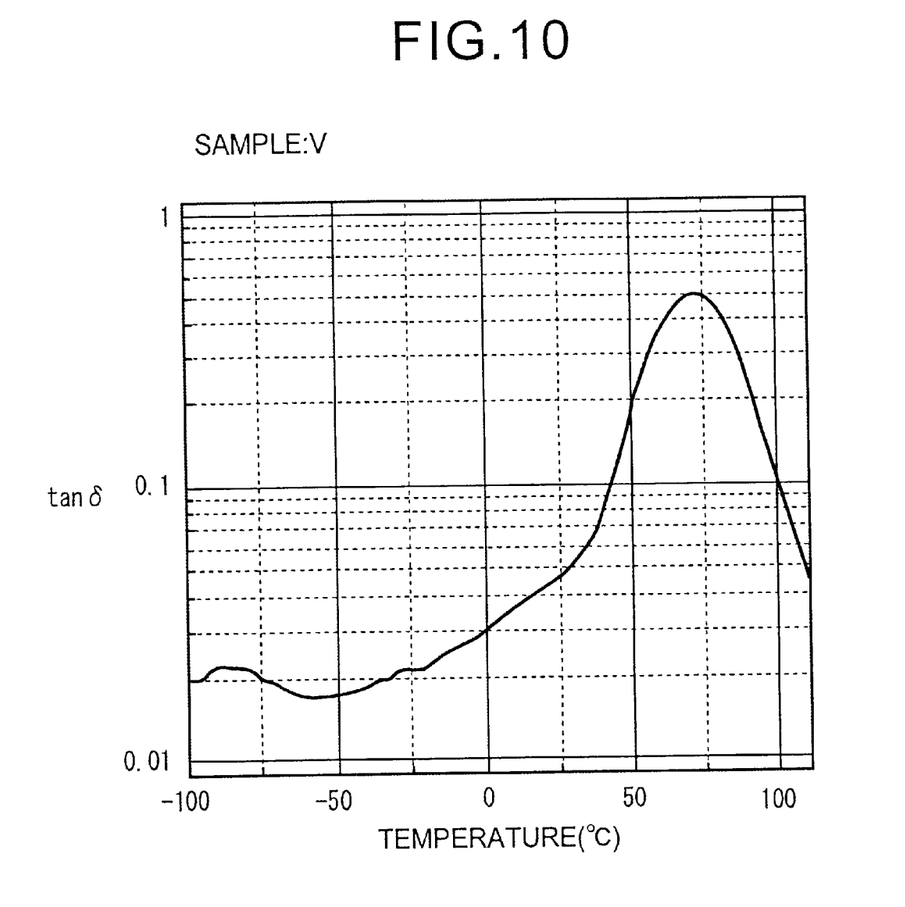
FIG. 10 is a graph showing the loss factor/temperature curve of a sample symbol V.

Incidentally, regarding the position at which the ball indenting tool is caused to act, as shown in FIG. 4, it is preferable that the position be near the central part of the individual, made-finer, lens surface forming the Fresnel lens, e.g. the portion such as that indicated by 2c, 2c', or 2" in FIG. 4. If the interval between adjacent two of the concave portions defined between the lens surfaces is determined as the pitch P, that position is in the vicinity of the position corresponding to P/2. In the case, as well, of other lens configurations, it is preferable to cause the ball indenting tool to act upon the position in the vicinity of the center of the individual lens surface forming the lens.

The compression modulus of elasticity (E) is determined using the equation below.

$$E = 1/\{2h^*(2R-h^*))^{1/2} \times H \times (\Delta H/\Delta f) - (1-n)/e\}$$
$$= 1/(5.586 \times h^* \times H \times (\Delta H/\Delta f) - 7.813 \times 10^{-7})$$

where the h* represents the intersection (the unit: mm) between a tangential line to the load/indentation curve defining a load decrease zone (the zone defined by the point (3), the point (4), and H in FIG. 3) when the load f is the maximum value F and the indentation axis (the abscissa axis).

The R represents the radius (R=0.4 mm) at the forward end of the indenting tool.

The H represents the maximum value (the unit: mm) of the indentation h.

The ΔH/Δh represents a reciprocal of the slope of the load/indentation curve defining the load decrease zone (the zone defined by the point (3), the point (4), and H in FIG. 3) when the load f is the maximum value F.

The n represents the Poisson's ratio (n=0.22) of the material (WC) forming the ball indenting tool.

The e represents the elastic modulus (e=5.3×10$^5$N/mm$^2$) of the material (WC) forming the ball indenting tool.

As explained previously, the increase and decrease of the load, etc. are repeatedly performed three times according to and in the sequential order of the procedures (1) to (4) and, for each repeated performance thereof, the load/indentation curve is determined. And, regarding each curve, the compression modulus of elasticity (E) (the unit: MPa) is determined, and the average value is determined.

The maximum amount of deformation represents the following the indentation (the unit: μm). Namely, as explained previously, after the load value becomes 20 mN representing the maximum load value, this load value is maintained for 60 seconds to cause creep deformation. The maximum amount of deformation represents the indentation immediately after the termination of that creep deformation.
(Production of the Sample Used for Measuring the $T_P$, the Maximum Value of the Loss Factor, the Equilibrium Elastic Modulus, and $W_{1/2}$ and $W_{0.1}$)

Excepting that a stainless steel whose surface is a mirror surface was used in place of a Fresnel lens forming die having a die configuration inverse to the configuration of the Fresnel lens, a resin sheet for use as the sample was obtained in the same way as that in which there was produced the sample for measuring the compression modulus of elasticity and maximum amount of deformation.
(Measurement of the $T_P$, the Maximum Value of the Loss Factor, the Equilibrium Elastic Modulus, and $W_{1/2}$ and $W_{0.1}$)

Using the above-described samples, the storage elastic modulus and the loss factor were measured by the use of a dynamic viscoelasticity measuring device (manufactured by KK Orientech) A forced vibration having a frequency of 1 Hz was applied to the sample in the longitudinal direction thereof and the sample temperature was increased at a heating rate of 3° C. per minute by changing the set temperature from −100° C. to +100° C.

Using the thus-obtained loss factor/temperature curve, the maximum value (tan δ(max)) of the loss factor was determined from the peak value in the configuration of the crest, and, the temperature that corresponds thereto at that time was represented as $T_P$ (the unit: ° C.)

Regarding the equilibrium elastic modulus, the storage elastic modulus at 80° C. was determined from the obtained storage elastic modulus/temperature curve and this was determined as the equilibrium elastic modulus (the unit: dyne/cm$^2$).

As the $W_{1/2}$, the width of the cross-sectioned portion when having cross-sectioned the crest of the loss factor by the value of ½ of the maximum value thereof was determined while, as the $W_{0.1}$, the width of the cross-sectioned portion when having cross-sectioned the crest by the value of 1/10, i.e. 0.1, of the maximum value of the loss factor was determined. In either case, the unit is ° C.
(Evaluation on the Crush of the Screen)

A Fresnel lens sheet and a lenticular lens sheet were combined or assembled into a projection screen by having their respective opposing lens surfaces located closely to each other and, in an actually assembled state where it was fixed to the screen-mounting frame of a projection type TV set, an image the whole of that is white-colored was projected from the projector with respect to the screen and, after 24 hours, the screen was observed.

As a result of the observation, the screen wherein the brightness unevenness attributable to the crushing of the lens configuration was clearly admitted was marked "x"; the screen wherein the brightness unevenness was not prominent although the existence thereof was admitted was marked "Δ"; and the screen wherein no brightness unevenness was admitted was marked "○".

These evaluations were performed at room temperature (25° C.), 40° C., and 50° C.

(Evaluation on the by Loading of Weight Caused Crush of the Screen)

A Fresnel lens sheet and a lenticular lens sheet were disposed by having their respective opposing lens surfaces located closely to each other and were combined together. The combined structure prepared by its full circumference being fixed using an adhesive tape was prepared 50 pieces. They were piled up in a state where a foamed polyethylene sheet was clamped between each two adjacent of these combined structures, and they were left to stand for one week at room temperature (25° C.). In this case, the surface pressure on the lowermost side combined structure is approximately 20 g/cm$^2$.

Thereafter, the lenticular lens sheet and Fresnel lens sheet of the combined structure that had been located on the lowermost side of the piled-up mass were fixed to the screen-mounting frame of the projection type TV set in the same way as in the above-described evaluation on the crushing of the screen at the actually assembled time. By projector, an image the whole of that was white-colored was projected and the screen was observed.

As a result of the observation, the screen wherein the brightness unevenness attributable to the crushing of the lens configuration or to the transfer of the pattern of the foamed polyethylene sheet was clearly admitted was marked "x"; the screen wherein the brightness unevenness was not prominent and was in the permissible range although the existence thereof was admitted was marked "Δ"; and the screen wherein no brightness unevenness was admitted was marked "○".

(Evaluation on the by Loading of Weight Caused Crush of the FRESNEL LENS)

Fresnel lens sheets were placed so that their respective lens surfaces may be pointed upward. A foamed polyethylene sheet was clamped between each two of the Fresnel lens sheets and 100 sheets of it were piled up. This piling was prepared two pieces. One of the pilings was left to stand at room temperature (25° C.) and the other was left to stand at 50° C., respectively, for one week. The piling that had been left to stand at 50° C., thereafter, was left to stand for 24 hours at room temperature. In this case as well, the surface pressure on the lowermost side Fresnel lens sheet is approximately 20 g/cm$^2$.

Thereafter, the Fresnel lens sheet that had been located on the lowermost side of the piled-up mass were taken out and this Fresnel lens sheet was fixed to the screen-mounting frame of the projection type TV set together with the lenticular lens sheet in the same way as in the above-described evaluation on the crushing of the screen at the actually assembled time. By projector, an image the whole of that was white-colored was projected and the screen was observed.

As a result of the observation, the screen wherein the brightness unevenness attributable to the crushing of the lens configuration was clearly admitted was marked "x"; the screen wherein the brightness unevenness was not prominent and was in the permissible range although the existence thereof was admitted was marked "Δ"; and the screen wherein no brightness unevenness was admitted was marked "○".

The above-described measured results of the various kinds of parameters and the results of the assumedly practical evaluations on the Fresnel lens sheet into which the resin composition was manufactured are shown, separately, as "Table 1" and "Table 2". In the "Table 1" and "Table 2", the sample symbols B to H and I to V concern the Examples while the sample symbols A and I to K concern the Comparative examples. Also, in FIGS. 5 to 10, the measured examples of the loss factor to temperature curve are graphically shown. The sample symbols shown in these graphs are common to those in the "Table 1" and "Table 2".

TABLE 1

| | Sample symbol | | | | | | | | | | |
|---|---|---|---|---|---|---|---|---|---|---|---|
| | A | B | C | D | E | F | G | H | I | J | K |
| Refractive index | 1.551 | 1.550 | 1.550 | 1.551 | 1.553 | 1.551 | 1.553 | 1.553 | 1.551 | 1.551 | 1.551 |
| Compression modulus of elasticity | 459 | 185 | 128 | 323 | 1405 | 498 | 1190 | 1627 | 746 | 886 | 969 |
| Maximum amount of deformation | 3.54 | 6.21 | 6.41 | 5.46 | 1.27 | 3.01 | 1.17 | 0.96 | 1.81 | 1.57 | 2.39 |
| Tp | 18.4 | 18.5 | 19.2 | 23.8 | 35.0 | 35.8 | 40.0 | 42.0 | 47.3 | 49.3 | 51.9 |
| tan δ (max) | 1.16 | 1.00 | 1.12 | 1.05 | 0.71 | 0.88 | 0.62 | 0.56 | 0.93 | 0.91 | 0.88 |
| Equilibrium elastic modulus (×10$^7$) | 18.5 | 9.1 | 7.5 | 6.12 | 29.8 | 8.59 | 29.8 | 18.7 | 6.78 | 9.21 | 9.52 |
| W$_{1/2}$ | 9.8 | 25.5 | 33.2 | 12.5 | 27.3 | 39.0 | 32.2 | 48.6 | 17.8 | 15.6 | 20.2 |
| W$_{0.1}$ | 43.6 | 45.2 | 57.5 | 43.8 | 48.1 | 55.3 | 60.0 | 68.9 | 56.1 | 49.4 | 56.2 |
| W$_{0.1}$–W$_{1/2}$ | 33.8 | 19.7 | 24.3 | 31.3 | 20.8 | 16.3 | 27.8 | 20.3 | 38.3 | 33.8 | 36.0 |
| W$_{0.1}$–W$_{1/2}$ | 4.5 | 1.8 | 1.7 | 3.5 | 1.8 | 1.4 | 1.9 | 1.4 | 3.2 | 3.2 | 2.8 |
| Crushing of the screen | | | | | | | | | | | |
| 25° C. | x | Δ | ○ | x | ○ | ○ | ○ | ○ | x | Δ | x |
| 40° C. | x | ○ | ○ | x | ○ | ○ | ○ | ○ | x | x | x |
| 50° C. | Δ | ○ | ○ | Δ | ○ | ○ | ○ | ○ | x | x | x |
| by loading of weight caused crush of the screen | x | Δ | ○ | Δ | Δ | ○ | ○ | ○ | x | x | x |

TABLE 1-continued

| | Sample symbol | | | | | | | | | | |
|---|---|---|---|---|---|---|---|---|---|---|---|
| | A | B | C | D | E | F | G | H | I | J | K |
| by loading of weight caused crush of the Fresnel lens | | | | | | | | | | | |
| 25° C. | Δ | Δ | ○ | Δ | ○ | ○ | ○ | ○ | x | Δ | x |
| 50° C. | x | ○ | ○ | x | ○ | ○ | ○ | ○ | x | x | x |

TABLE 2

| | Sample symbol | | | | | | | | | | |
|---|---|---|---|---|---|---|---|---|---|---|---|
| | L | M | N | O | P | Q | R | S | T | U | V |
| Refractive index | 1.554 | 1.553 | 1.551 | 1.551 | 1.553 | 1.553 | 1.553 | 1.554 | 1.552 | 1.552 | 1.553 |
| Compression modulus of elasticity | 1916 | 2909 | 1527 | 1147 | 2161 | 2328 | 2797 | 2900 | 1929 | 2549 | 3040 |
| Maximum amount of deformation | 0.90 | 0.63 | 1.11 | 1.35 | 0.88 | 0.60 | 0.61 | 0.59 | 0.93 | 0.68 | 0.77 |
| Tp | 52.8 | 53.0 | 56.4 | 57.0 | 59.0 | 59.2 | 60.0 | 62.0 | 70.0 | 70.0 | 71.0 |
| tan δ (max) | 1.06 | 1.09 | 0.81 | 0.92 | 0.99 | 0.92 | 1.01 | 0.85 | 0.63 | 0.46 | 0.51 |
| Equilibrium elastic modulus (×10$^7$) | 11.3 | 12.4 | 15.8 | 45.8 | 20.5 | 17.4 | 11.5 | 21.5 | 35.6 | 47.9 | 28.7 |
| $W_{1/2}$ | 18.4 | 17.2 | 20.3 | 18.8 | 17.2 | 20.6 | 18.1 | 19.8 | 21.2 | 43.3 | 36.6 |
| $W_{0.1}$ | 41.2 | 39.5 | 47.6 | 48.4 | 40.2 | 44.8 | 42.2 | 41.5 | 42.6 | 68.3 | 57.1 |
| $W_{0.1}-W_{1/2}$ | 22.8 | 22.3 | 27.3 | 29.6 | 23.0 | 24.2 | 24.1 | 21.7 | 21.4 | 25.0 | 20.5 |
| $W_{0.1}-W_{1/2}$ | 2.2 | 2.3 | 2.3 | 2.6 | 2.3 | 2.2 | 2.3 | 2.1 | 2.0 | 1.6 | 1.6 |
| Crushing of the screen | | | | | | | | | | | |
| 25° C. | ○ | ○ | ○ | ○ | ○ | ○ | ○ | ○ | ○ | ○ | ○ |
| 40° C. | Δ | ○ | ○ | ○ | ○ | ○ | ○ | ○ | ○ | ○ | ○ |
| 50° C. | Δ | Δ | Δ | Δ | ○ | Δ | ○ | ○ | ○ | ○ | ○ |
| by loading of weight caused crush of the screen | ○ | ○ | ○ | ○ | ○ | ○ | ○ | ○ | ○ | ○ | ○ |
| by loading of weight caused crush of the Fresnel lens | | | | | | | | | | | |
| 25° C. | ○ | ○ | ○ | ○ | ○ | ○ | ○ | ○ | ○ | ○ | ○ |
| 50° C. | Δ | Δ | Δ | Δ | ○ | Δ | ○ | ○ | ○ | ○ | ○ |

According to the invention as described in the first aspect, since the range of the difference between the half value width and the 0.1 value width of the loss factor/temperature curve is defined, it is possible to provide a resin composition for production of an optical element whose behavior is not excessively sharply sensitive to the change in temperature and which has an appropriate level of elasticity as that of a viscoelastic body and in which, in an ordinary range of use temperature, there are no damages resulting from the pressure applied during the use, or no crushes possible when they have been piled up by their being laid horizontal, which will become an obstacle to handling the optical element obtained using this resin composition.

According to the invention as described in the second aspect, since the range of the ratio between the half value width and the 0.1 value width of the loss factor/temperature curve is defined, it is possible to provide a resin composition for production of an optical element whose behavior, as in the first invention, is not excessively sharply sensitive to the change in temperature and which, as in the first invention, has an appropriate level of elasticity as that of a viscoelastic body and in which, as in the first invention, in an ordinary range of use temperature, there are no damages resulting from the pressure applied during the use, or no crushes otherwise possible when they have been piled up by their being laid horizontal, which will become an obstacle to handling the optical element obtained using this resin composition.

According to the invention as described in the third aspect, since the range of the half value width of the loss factor/temperature curve and the range of the value of the $T_P$ are defined, it is possible to provide a resin composition for production of an optical element which, in addition to the effect similar to that attainable with the first aspect, by having rubber elasticity and rigidity, has a high retainability of the configuration and prevents a curving of the lens sheet.

According to the invention as described in the fourth aspect, in addition to the effect of the invention as described in any one of the first to third aspects, since defining the range of the maximum value of the loss factor/temperature curve, it is possible to provide a resin composition for production of an optical element which has durability with respect to rubbing and has ensured mechanical properties against a high temperature.

According to the invention as described in the fifth aspect, it is possible to provide an optical element which is formed with a resin composition for production of an optical element capable of exhibiting the effect of the invention according to any one of the first to fourth aspects.

According to the invention as described in the sixth aspect, it is possible to provide an optical element in which the cross-sectional configuration of the optical element surface is shaped like a saw tooth and has their forward ends sharpened and which, when applied to a Fresnel lens sheet sensitive to crushing or chipping-off, enables more exhibiting the effect of the invention according to the fifth aspect.

According to the invention as described in the seventh aspect, it is possible to provide a projection screen which, in a combined structure of a Fresnel lens sheet and lenticular lens sheet, exhibits the effect of the invention according to the fifth or sixth aspect.

What is claimed is:

1. A resin composition for production of an optical element being adapted to form the optical element, wherein, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; $W_{0.1}$ (° C.) represents, regarding the crest portion, the width of the crest portion at the position of 0.1 of the maximum value of the loss factor; and $\Delta W$ (° C.), the difference between the widths of the two crest portions, is set to be $\Delta W = W_{0.1} - W_{1/2}$ the $\Delta W$ is in the range of from 16° C. to 31° C.

2. A resin composition according to claim 1, wherein the maximum value of the loss factor is in the range of from 0.4 to 1.2.

3. A resin composition for production of an optical element being adapted to form the optical element, wherein, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; and $W_{0.1}$ (° C.) represents, regarding the crest portion, the width of the crest portion at the position of 0.1 of the maximum value of the loss factor, $W_{0.1}/W_{1/2}$ representing the ratio between the widths of the two crest portions is in the range of from 1.4 to 2.7.

4. A resin composition according to claim 3, wherein the maximum value of the loss factor is in the range of from 0.4 to 1.2.

5. A resin composition for production of an optical element being adapted to form the optical element, wherein, when $W_{1/2}$ (° C.) representing, regarding a crest portion in a loss factor/temperature curve obtained by measuring the loss factor of the resin composition relative to a change in the temperature, the width of the crest portion at the position of ½ of the maximum value of the loss factor in the crest portion temperature range is in the range of from 13° C. to 50° C. and the value $T_P$(° C.) of the temperature at the maximum value of the loss factor is in the range of from 18° C. to 47° C. or from 52° C. to 80° C.

6. A resin composition according to claim 5, wherein the maximum value of the loss factor is in the range of from 0.4 to 1.2.

7. An optical element the whole or a part of which is formed with a resin composition, wherein the resin composition has a characteristics of which, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; $W_{0.1}$ (° C.) represents, regarding the crest portion, the width of the crest portion at the position of 0.1 of the maximum value of the loss factor; and $\Delta W$ (° C.), the difference between the widths of the two crest portions, is set to be $\Delta W = W_{0.1} - W_{1/2}$, the $\Delta W$ is in the range of from 16° C. to 31° C.

8. An optical element according to claim 7, wherein the maximum value of the loss factor is in the range of from 0.4 to 1.2.

9. An optical element according to claim 7, wherein the optical element is a Fresnel lens sheet.

10. An optical element the whole or a part of which is formed with a resin composition, wherein the resin composition has a characteristics of which, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; and $W_{0.1}$ (° C.) represents, regarding the crest portion, the width of the crest portion at the position of 0.1 of the maximum value of the loss factor, $W_{0.1}/W_{1/2}$ representing the ratio between the widths of the two crest portions is in the range of from 1.4 to 2.7.

11. An optical element according to claim 10, wherein the maximum value of the loss factor is in the range of from 0.4 to 1.2.

12. An optical element according to claim 10, wherein the optical element is a Fresnel lens sheet.

13. An optical element the whole or a part of which is formed with a resin composition, wherein the resin composition has a characteristics of which, when $W_{1/2}$ (° C.) representing, regarding a crest portion in a loss factor/temperature curve obtained by measuring the loss factor of the resin composition relative to a change in the temperature, the width of the crest portion at the position of ½ of the maximum value of the loss factor in the crest portion temperature range is in the range of from 13° C. to 50° C. and the value $T_P$(° C.) of the temperature at the maximum value of the loss factor is in the range of from 18° C. to 47° C. or from 52° C. to 80° C.

14. An optical element according to claim 13, wherein the maximum value of the loss factor is in the range of from 0.4 to 1.2.

15. An optical element according to claim 13, wherein the optical element is a Fresnel lens sheet.

16. A projection screen comprising a lenticular lens sheet and an optical element the whole or a part of which is formed with a resin composition, wherein the resin composition has a characteristics of which, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; $W_{0.1}$ (° C.) represents, regarding the crest portion, the width of the crest portion at the position of 0.1 of the maximum value of the loss factor; and $\Delta W$ (° C.), the difference between the widths of the two crest portions, is set to be $\Delta W = W_{0.1} - W_{1/2}$, the $\Delta W$ is in the range of from 16° C. to 31° C.

17. An optical element according to claim 16, wherein the maximum value of the loss factor is in the range of from 0.4 to 1.2.

18. A projection screen according to claim 16, wherein the optical element is a Fresnel lens sheet.

19. A projection screen comprising a lenticular lens sheet and an optical element the whole or a part of which is formed with a resin composition, wherein the resin composition has a characteristics of which, when $W_{1/2}$ (° C.) represents, regarding a crest portion in a loss factor/temperature curve obtained by measuring the loss factor of the resin composition relative to a change in the temperature, the width of the crest portion at the position of ½ of the maximum value of the loss factor in the crest portion temperature range; and $W_{0.1}$ (° C.) represents, regarding the crest portion, the width of the crest portion at the position of 0.1 of the maximum value of the loss factor, $W_{0.1}/W_{1/2}$ representing the ratio between the widths of the two crest portions is in the range of from 1.4 to 2.7.

20. A projection screen according to claim 19, wherein the maximum value of the loss factor is in the range of from 0.4 to 1.2.

21. A projection screen according to claim 19, wherein the optical element is a Fresnel lens sheet.

22. A projection screen comprising a lenticular lens sheet and an optical element the whole or a part of which is formed with a resin composition, wherein the resin composition has a characteristics of which, when $W_{1/2}$ (° C.) representing, regarding a crest portion in a loss factor/temperature curve obtained by measuring the loss factor of the resin composition relative to a change in the temperature, the width of the crest portion at the position of ½ of the maximum value of the loss factor in the crest portion temperature range is in the range of from 13° C. to 50° C. and the value $T_P$(° C.) of the temperature at the maximum value of the loss factor is in the range of from 18° C. to 47° C. or from 52° C. to 80° C.

23. A projection screen according to claim 22, wherein the maximum value of the loss factor is in the range of from 0.4 to 1.2.

24. A projection screen according to claim 22, wherein the optical element is a Fresnel lens sheet.

* * * * *